United States Patent [19]

Spirk

[11] 4,149,100
[45] Apr. 10, 1979

[54] EXCITATION WINDING ARRANGEMENT FOR A SYNCHRONOUS ELECTRIC MACHINE HAVING A ROTOR WITH SALIENT POLES

[75] Inventor: Franz Spirk, Berlin, Fed. Rep. of Germany

[73] Assignee: Siemens Aktiengesellschaft, Munich, Fed. Rep. of Germany

[21] Appl. No.: 721,376

[22] Filed: Sep. 8, 1976

Related U.S. Application Data

[63] Continuation of Ser. No. 539,952, Jan. 10, 1975, abandoned.

[30] Foreign Application Priority Data

Feb. 1, 1974 [DE] Fed. Rep. of Germany ... 7403915[U]

[51] Int. Cl.² .............................................. H02K 1/32
[52] U.S. Cl. ...................................... 310/65; 310/194; 310/214
[58] Field of Search ............... 310/179, 180, 187, 192, 310/194, 214, 215, 216, 217, 218, 65, 59, 52, 60, 61, 42, 45, 60 A, 162, 163, 165, 58, 269, 43, 64, 208, 261, 262, 264, 265

[56] References Cited

U.S. PATENT DOCUMENTS

| 2,844,746 | 7/1958 | Coggeshall | 310/65 |
| 3,504,207 | 3/1970 | Tjernstrom | 310/59 |
| 3,585,276 | 6/1971 | Beckett | 310/65 |
| 3,846,651 | 11/1974 | Mishra | 310/269 |

FOREIGN PATENT DOCUMENTS

| 931299 | 8/1955 | Fed. Rep. of Germany | 310/60 A |
| 1536669 | 7/1968 | France | 310/60 A |

*Primary Examiner*—R. Skudy
*Attorney, Agent, or Firm*—Kenyon & Kenyon, Reilly, Carr & Chapin

[57] ABSTRACT

An excitation winding arrangement is provided for a synchronous electric machine having a rotor with shoeless, salient poles wherein the excitation windings are secured by slot wedges in gaps defined by the poles. The excitation winding arrangement includes coils which define the excitation winding and are formed by flat conductors, either singly or in bundles, are held in spaced relation by respective combs at the bottom of the slots and under the slot wedge to form cooling ducts to achieve good air cooling of the excitation winding in the region of the pole gap.

3 Claims, 2 Drawing Figures

EXCITATION WINDING ARRANGEMENT FOR A SYNCHRONOUS ELECTRIC MACHINE HAVING A ROTOR WITH SALIENT POLES

This is a continuation of application Ser. No. 539,952 filed Jan. 10, 1975 now abandoned.

BACKGROUND OF THE INVENTION

In synchronous electric machines, the salient poles in the rotor, which carry the excitation winding, can be configured without pole shoes. In this connection, reference may be had to *Leitfaden der Elektrotechnik* der Elektrotechnik by Moeller-Werr, Vol. III, 3.ed., page 42. With this configuration, there is obtained a pole gap of approximately rectangular shape into which the excitation windings can be put in place very simply in the radial direction. The excitation winding fills the pole gaps practically completely and is held in place by slot wedges. This, however, means that the removal of the heat generated in the excitation windings in the region of the pole gaps by air cooling alone is difficult.

It is an object of the invention to provide an excitation winding arrangement wherein the advantage of simple mounting of the excitation winding in the radial direction in a synchronous electric machine is to be retained and nevertheless an effective cooling of the excitation winding by air achieved also in the pole gaps.

SUMMARY OF THE INVENTION

The above object is realized with the excitation winding arrangement according to the invention for a synchronous electric machine equipped with salient poles at the rotor which are constructed without pole shoes, the excitation windings being secured in the pole gap by slot wedges. The excitation winding arrangement according to the invention includes coils defining the excitation winding. These coils are wound of flat electric conductors having surfaces parallel to the walls of the poles and which, either singly or combined in bundles, are kept spaced from each other by means of combs of insulating material which are arranged under the slot wedges and at the slot bottom of the pole gap.

The coils of the excitation winding are given very great stiffness by winding the flat conductors over the narrow edge so that the combs arranged under slot wedge and at the bottom of the slot of the pole gap are sufficient to mechanically secure the winding within the pole gap. In addition, the combs form in this manner, between the individual flat conductors combined in bundles, cooling ducts which run in the axial direction and into which cooling air can enter at the end-faces of the machine and flow through it in the axial direction. In this way, effective removal of the generated heat is achieved in the excitation windings. The coils of the excitation winding, moreover, need to be provided only with turn insulation because the combs of insulating material constitute sufficient immulation of the flat conductors with respect to the laminations of the rotor lamination stack and with respect to the non-magnetic slot wedges.

Although the invention is illustrated and described herein as an excitation winding arrangement for a synchronous electric machine having a rotor with salient poles, it is nevertheless not intended to be limited to the details shown, since various modifications may be made therein within the scope and the range of the claims. The invention, however, together with additional objects and advantages will be best understood from the following description and in connection with the accompanying drawing.

DESCRIPTION OF THE PREFERRED EMBODIMENTS OF THE INVENTION

Figure 1:
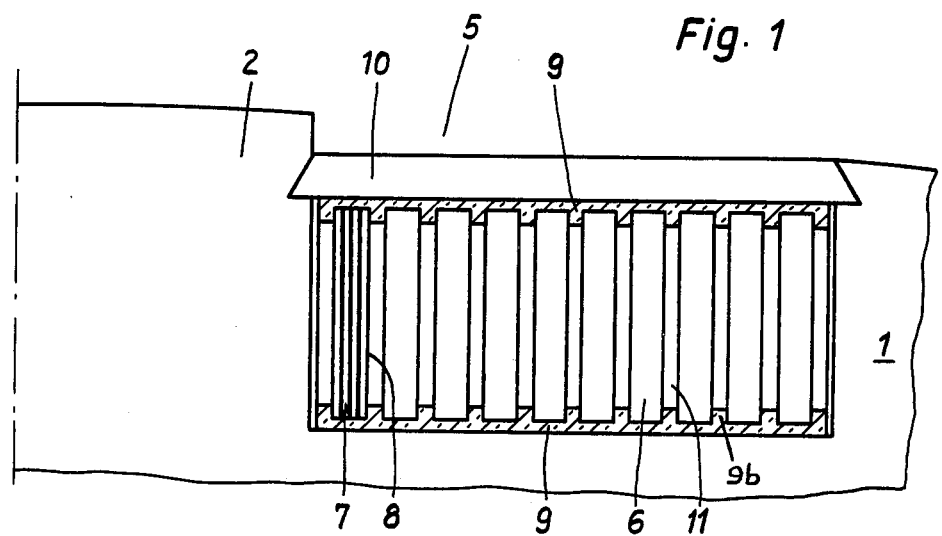
FIG. 1 is a part of a radial section taken through the stack of rotor laminations of an electric machine equipped with the excitation winding arrangement according to the invention.

In the rotor 1 of a synchronous electric machine, the laminated excitation poles 2 are provided with end-plates 4 at their end-faces 3 and have no pole shoes. Thus, the laminations forming the pole 2 as well as the pole gaps 5 have a shape which is approximately rectangular. This affords the advantage that the excitation windings 6 surrounding the poles 2 can be installed and removed in the radial direction in the simplest manner.

The mechanical configuration of the excitation winding provided by the invention can be applied irrespective of whether every pole or only every second pole 2 of the rotor 1 is equipped with an excitation winding 6 as is the case in the illustrated embodiment.

Figure 2:
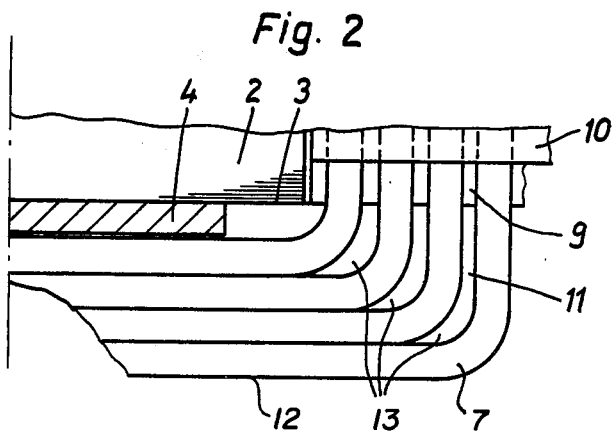
FIG. 2 is a fragmentary plan view of a salient rotor pole upon which is supported the excitation winding in accordance with the excitation winding arrangement of the invention.

The excitation winding 6 includes a coil with flat conductors 7 of copper, which are wound over the narrow edge in such a manner that the surfaces 8 of the flat conductors 7 run parallel to the walls of the poles 2. This results in great stiffness of the excitation winding 6. The flat conductors 7 are combined in respective bundles, for instance, of four turns and are kept spaced from each other by comb means in the form of combs 9 of insulating material which include spacer members 9b for holding the turns of excitation winding 6 in spaced-apart relationship. The combs 9 are disposed at the bottom of the slot of the pole gap 5 and under the non-magnetic slot wedges 10 which close off the pole gap 5. This produces between the individual bundles of flat conductors 7 within the excitation winding 6 cooling ducts 11 which run in the axial direction in the pole gap 5. These cooling ducts 11 extend beyond the pole gaps 5 and the end-faces 3 to a location in front of the end-faces 3 of the poles 2 in front of which the individual bundles of the coil of the excitation winding 6 are then led along side by side so that the overhang 12 of the excitation winding 6 on the end-face side is as small as possible. In this region of the cooling ducts 11 which lies in front of the plane defined by the end-face 3 of the poles 2 and beyond the combs 9, the cooling air can enter without difficulty at the opening 13 between adjacent conductors 7 because the combs 9 do not extend beyond the end-face 3 of pole 2 as shown in FIG. 2. The air then flows in the region of the pole gap 5 through the cooling ducts 11 closed off by the combs 9 in the region of the pole gap 5 between the end-faces of the pole 2 until it can leave the cooling ducts 11 again at the other end-face of the machine. In this manner, an effective removal of the heat produced in the excitation windings 6 is achieved over the entire axial length of the pole gaps 5.

The illustrated embodiment shows the flat conductors arranged in a plurality of groups of conductors with the comb means configured so as to hold each two mutually adjacent ones of the groups in spaced relation to each other so as to define a fluid cooling duct therebetween. Alternately, the comb means can be configured to hole each two mutually adjacent ones of the turns in spaced relation to each other so as to define a fluid cooling duct therebetween.

What is claimed is:

1. An improved electric synchronous machine having an excitation winding and a rotor with shoeless, salient poles defining pole gaps and slot wedges for holding the excitation winding in the pole gaps, wherein the improvement comprises:

an excitation winding arrangement comprising:

a plurality of coils defining the excitation winding, each of said coils being wound from a flat conductor so that the surfaces of said flat conductor extend parallel to the walls of the corresponding pole; and a comb structure of insulating material arranged in the pole gap at the pole gap bottom to space the turns of said flat conductor and to space said flat conductor from said pole gap bottom and a further comb structure of insulating material arranged beneath the slot wedge to space the turns of said flat conductor and to space said flat conductor from said slot wedge.

2. An improved electric synchronous machine in accordance with claim 1, wherein the improvement further comprises: each of said comb structures having a plurality of spaced members holding each two mutually adjacent ones of said turns in spaced relation to each other so as to define a fluid cooling duct therebetween.

3. An improved electric synchronous machine in accordance with claim 2, wherein the improvement further comprises: said turns being apportioned into a plurality of groups of turns, each of said groups being placed between a corresponding pair of mutually adjacent spaced members of each of said comb structures so that each two mutually adjacent ones of said groups is in spaced relation to each other so as to define a fluid cooling duct therebetween.

* * * * *